US012797965B2

(12) United States Patent
Schmieder et al.

(10) Patent No.: US 12,797,965 B2
(45) Date of Patent: Nov. 17, 2026

(54) CLAMPING SYSTEM WITH POLYGONAL RECEPTACLE FOR A HOLLOW SHAFT

(71) Applicant: WTO Vermögensverwaltung GmbH, Ohlsbach (DE)

(72) Inventors: Markus Schmieder, Berghaupten (DE); Karlheinz Jansen, Schutterwald (DE)

(73) Assignee: WTO VERMÖGENSVERWALTUNG GMBH, Ohlsbach (DE)

( * ) Notice: Subject to any disclaimer, the term of this patent is extended or adjusted under 35 U.S.C. 154(b) by 291 days.

(21) Appl. No.: 18/700,611

(22) PCT Filed: Oct. 17, 2022

(86) PCT No.: PCT/EP2022/078806
§ 371 (c)(1),
(2) Date: Apr. 11, 2024

(87) PCT Pub. No.: WO2023/062240
PCT Pub. Date: Apr. 20, 2023

(65) Prior Publication Data

US 2025/0018478 A1 Jan. 16, 2025

(30) Foreign Application Priority Data

Oct. 15, 2021 (DE) ..................... 10 2021 126 778.1

(51) Int. Cl.
*B23B 31/26* (2006.01)

(52) U.S. Cl.
CPC ........ *B23B 31/265* (2013.01); *B23B 2231/24* (2013.01); *B23B 2231/48* (2013.01)

(58) Field of Classification Search
CPC . B23B 31/26; B23B 31/265; B23B 2260/004; B23B 2231/48; B23B 2231/04;
(Continued)

(56) References Cited

U.S. PATENT DOCUMENTS 4,934,883 A * 6/1990 Andersson ............ B23B 31/006
409/234
5,340,248 A * 8/1994 Enbergs ................ B23B 31/261
408/239 R
(Continued)

FOREIGN PATENT DOCUMENTS

DE 3807140 A1 * 12/1988 ........... B23B 31/261
DE 4127661 A1 2/1993
(Continued)

OTHER PUBLICATIONS

International Preliminary Report on Patentability for application No. PCT/EP2022/078806 dated Jan. 5, 2024 with English translation, 21 pages.
(Continued)

*Primary Examiner* — Nicole N Ramos
(74) *Attorney, Agent, or Firm* — Carter, DeLuca & Farrell, LLP

(57) ABSTRACT

A spindle for a polygonal hollow-shaft taper is proposed which permits optimal use of the interior of the spindle for receiving a clamping system and an optional cylinder structure. The spindle has a recess (11) comprising a centering receptacle (7) for an adapter (2) having a polygonal outer contour and hollow shaft, an annular groove (65) and a receiving bore (9). A clamping system (4) is arranged in the receiving bore (9). The clamping system (4) has a collar (67). The collar (67) has a polygonal outer contour, or the outer contour is formed by a plurality of lugs. The collar (67) fits through the centering receptacle (7) in at least one position. An at least one-sided positive-locking fit is established between the collar (67) and the annular groove (65) by rotating the collar (67) relative to the spindle (1).

20 Claims, 4 Drawing Sheets

(58) Field of Classification Search
CPC ............ B23B 2231/24; B23B 2231/36; B23B 2231/46; Y10T 279/1045; Y10T 279/1058; Y10T 279/17521; Y10T 279/17743; Y10T 279/185; Y10T 279/29; B23Q 3/12
See application file for complete search history.

(56) References Cited

U.S. PATENT DOCUMENTS

2016/0052063 A1 2/2016 Englund
2017/0043408 A1* 2/2017 Chen ..................... B23B 31/006

FOREIGN PATENT DOCUMENTS

DE 19618610 A1 11/1996
DE 102007033350 A1 * 1/2009 ........... B23B 31/265
EP 294348 A * 12/1988
EP 2164662 A1 3/2010
EP 1924379 B1 5/2013
EP 3825046 A1 5/2021
JP S54031982 U 3/1979
JP S61067261 U 5/1986
JP H05200610 A 8/1993
JP 2000246523 9/2003
JP 2016043478 A 4/2016

OTHER PUBLICATIONS

International Search Report for application No. PCT/EP2022/078806 dated Feb. 27, 2023 with English translation, 5 pages.
Written Opinion for application No. PCT/EP2022/078806 dated Apr. 20, 2023 with English translation, 14 pages.
Notice of Reasons for Rejection of JP 2024-515696 dated Sep. 1, 2026 with English translation, 4 pages.

* cited by examiner

CLAMPING SYSTEM WITH POLYGONAL RECEPTACLE FOR A HOLLOW SHAFT

Clamping systems with a hollow shaft and a complementary shaped centering mount, for example according to ISO 12164 or ISO 26623, have proven themselves on the market for many years.

Among other things, they are used in driven or fixed tool holders. Then, the centering mount and the clamping system are integrated in the spindle of the driven tool holder or in the housing of the tool holder. In the following, the term "spindle" is used for rotating and non-rotating receptacles of the clamping system and centering receptacle. The hollow shaft is part of an adapter that for example carries a drill, a milling cutter, a turning tool or another tool.

To be able to transmit the required torque between the spindle and the adapter and to achieve a defined position of the tool with repeated accuracy, centering receptacles have been used for decades with a truncated cone which has a polygonal cross-section (hereinafter also referred to as an inner polygon). The hollow shaft of the adapter has a complementary outer contour (hereinafter also referred to as an outer polygon).

The known clamping systems for clamping such a polygonal hollow shaft comprise a collet consisting of multiple clamping segments. The clamping segments are arranged around a tension bolt. An axial movement of the tension bolt relative to the clamping segments presses them radially outward into a groove of the hollow shaft. This initially results in a positive-locking fit with the hollow shaft at the front ends of the clamping segments. A further movement of the tension bolt creates an axial clamping force, which the clamping segments exert on the hollow shaft of the adapter, such that the adapter is pulled into the centering mount. An example of such a clamping system is known from EP 2 164 662.

Similar clamping systems are known from EP 1 924 379 B1 and DE 196 18 610 A1.

The forces required for clamping and releasing are provided for example by a cylinder structure in automatic systems. This cylinder structure, which is actuated fluidically (e.g., pneumatically or hydraulically), must also be integrated into the spindle. It is obvious that the installation space available for the clamping system and the cylinder structure in a, for example, driven spindle is very limited both in the radial and in the axial direction. Even in the case of standing tool holders, the available space for the clamping system is becoming increasingly smaller due to increasingly smaller installation spaces. The available installation space must therefore be optimally utilized here as well.

The mounting of the clamping system and the optional cylinder structure into the spindle must in most cases be accomplished by the centering receptacle (the inner polygon) in order to achieve a very compact radial design.

The invention is based on the object of providing a clamping system which makes it possible to best exploit the installation space available in a rotatably mounted or a fixed spindle. In addition, the mounting of the clamping system and cylinder structure should be easy and time-saving. In the event of an overhaul or repair, the clamping system and the cylinder structure should be easily removable.

According to the invention, this object is achieved by a rotatably mounted or fixed spindle, wherein the spindle has a recess which comprises a centering receptacle, an annular groove, and a receiving bore for a clamping system, and an optional cylinder structure for actuating the clamping system, wherein the centering receptacle, which is designed as a polygonal inner cone and accommodates an adapter with a polygonal outer contour and hollow shaft, wherein the centering system comprises a collar, wherein the clamping system comprises a collar, wherein the collar has a polygonal outer contour, or the outer contour is formed by a plurality of lugs distributed over the circumference, wherein the collar fits through the centering receptacle in at least one rotational position, and a positive-locking fit is established in at least one axial direction between the collar and the annular groove by rotating the collar relative to the spindle into at least one locking position.

As a result of this type of locking mechanism of the housing or the collar in the annular groove in the manner of a bayonet closure, the diameter of the receiving bore and consequently also the diameter of the installable housing or of the clamping system can be maximized. It can be the same size or only slightly smaller than the inscribed circle of the smallest inner polygon of the centering receptacle.

For the actual axial securing of the collar in the spindle, the space directly behind the centering receptacle is formed as an annular groove. There, the centering receptacle has its smallest diameter at the transition between the centering receptacle and the receiving bore. The installation space requirement for the locking mechanism according to the invention is therefore minimal.

It is particularly advantageous that the outer diameter of the clamping system and a cylinder structure possibly arranged behind the clamping system can be maximized. This gives the designer of the clamping system and cylinder structure degrees of freedom in the design, and furthermore also increases the actuating forces that the cylinder structure can provide in order to clamp or release the clamping system, since a cylinder structure with a larger piston diameter can be installed.

A further advantage is that the number of components is reduced. The collar and the annular groove can be controlled well in production. Furthermore, due to this small number of components and their structure, the axial transmission of force by the clamping system to the spindle is extremely rigid.

Because the axial securing of the clamping system can also take place in both directions at one location, namely the collar or the annular groove, very narrow tolerances can be selected here so that a very precise axial positioning of the clamping system and the cylinder structure can be realized without increased manufacturing effort.

In an advantageous development of the invention, a diameter of the annular groove is equal to or somewhat larger than a circumference of the outer contour of the collar.

In order to secure the positive-locking fit according to the invention against unintentional release, a recess is formed in the collar. A securing pin which dips into the recess is inserted into a bore (with or without a thread) in the spindle. In this way, a positive-locking fit and releasable anti-rotation lock of the collar and therefore also of the clamping system relative to the spindle is created.

The securing pin can be designed, for example, as a threaded pin. Other one or two-part designs can be realized at any time, as long as the basic function of the positive-locking fit and releasable anti-rotation lock is maintained.

In a preferred development, the recess is arranged at a high point of the polygonal collar or a lug of the collar.

Furthermore, it is advantageous if a width of the annular groove is equal to or slightly greater than a width of the collar. The difference between the width of the annular groove and the width of the collar results in the axial play with which the clamping system is positioned in the spindle.

A very low axial play of less than 0.1 mm can easily be realized. An axial play of 0.05 mm can also be realized. If the annular groove is 0.02 mm to 0.05 mm wider than the collar, then this is considered "equivalent." The play prevents a clamping of the collar in the annular groove and facilitates assembly.

The receiving bore in the spindle can be designed as a polygon at least sectionally. Even more installation space in the interior of the spindle is then available for the clamping system and an optional cylinder structure. The piston or pistons of the cylinder structure can also be designed as a polygon.

If the receiving bore in the spindle is designed at least sectionally as a polygon, then the collar is or the collar and the housing are rotatable relative to the rest of the clamping system (4) or the cylinder structure (6). The collar then functions like a locking ring and forms an axial stop in the clamping direction. The piston and the rest of the system can then rest on the entire surface of the polygonal contour of the bore and use the full cross-sectional surface of the polygonal receiving bore.

In another advantageous embodiment of the invention, the optional cylinder structure comprises a piston rod, wherein the piston rod has a central bore for supplying a tool clamped in the clamping system with cooling lubricant, and wherein the piston rod penetrates a seal support and ends in a supply space of the spindle.

This seal support separates the supply space in which cooling lubricant is located from the cylinder structure so that the fluidic working medium of the cylinder construction (such as for example compressed air or hydraulic fluid) and the cooling lubricant in the supply space do not come into contact with one another. Even if cooling lubricant is used in the cylinder structure, it should not be mixed with the cooling lubricant in the supply space, since greater purity requirements are placed on the cooling lubricant used in the cylinder structure.

A particularly advantageous embodiment of the invention provides that the seal support comprises a flange and a threaded section with an external thread, wherein an annular groove is formed between the flange and the threaded section. In the region of the threaded section, a gap is formed between the piston rod and the sealing support, and at least one bore connects the annular groove and the gap to one another. In this way, it is possible in a very easy and space-saving manner to convey cooling lubricant from the outside, i.e. from the spindle into the annular groove, through the at least one bore and the gap into the supply space.

According to the invention, at least one bore is provided in the spindle and opens into a space delimited by the annular groove and the spindle. Cooling lubricant is conveyed to the sealing support or the annular groove through this bore.

In order to hydraulically separate the supply space from the cylinder structure, at least one seal is arranged in the flange of the seal support. This seal seals the piston rod relative to the supply space. In addition, in an advantageous development of the invention, a stationary seal can be arranged in the flange, which seal seals the flange of the seal support relative to the spindle.

Further advantages and advantageous embodiments of the invention can be found in the following drawings, the descriptions and the claims. All features disclosed in the drawings, their descriptions and the patent claims can be essential to the invention, both individually and in any combination with one another.

DRAWINGS

DESCRIPTION OF THE EXEMPLARY EMBODIMENTS

Figure 1:
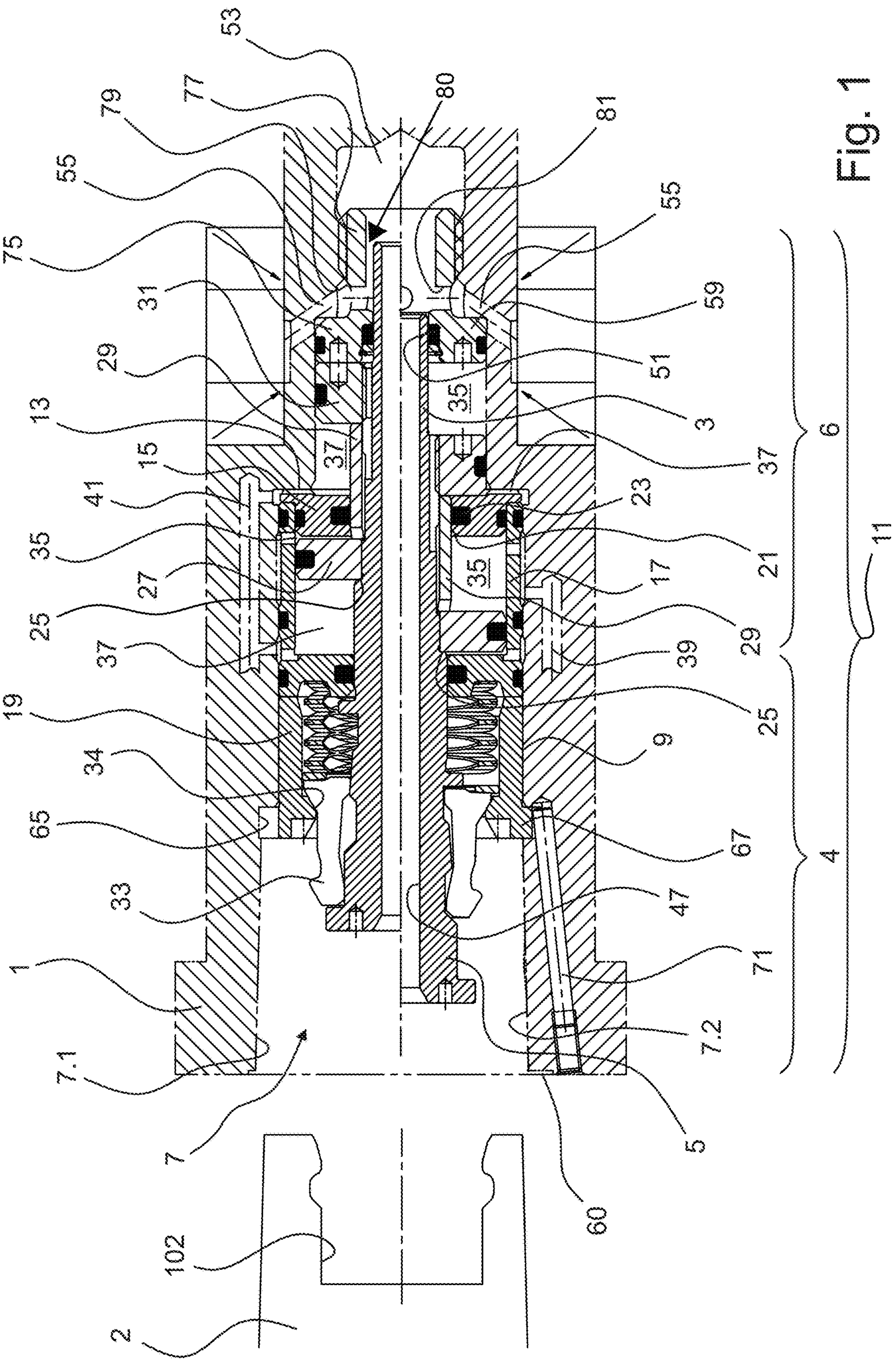
FIG. 1 shows a first exemplary embodiment of the invention in a longitudinal section.

In the context of the invention, the term "adapter" is used as a generic term for all components or assemblies that can be clamped in a polygonal centering receptacle 7 of a spindle 1 with the aid of the clamping system according to the invention. This can be a tool (e. g., drill, milling cutter, turning tool), an adapter (drill chuck, collet holder, cutting chuck for receiving indexable inserts), a device and more.

As already mentioned several times, the invention is described with reference to a rotatably mounted spindle 1. However, the spindle 1 can also be a fixed spindle.

At its end facing the centering receptacle 7, the adapter 2 has a conical polygonal outer contour, which is also referred to below as an outer polygon. The centering receptacle 7 is shaped complementarily to the outer polygon of the adapter 2. The shape of the centering receptacle 7 is therefore also referred to as an inner polygon. This polygon connection has been established on the market for many years and is standardized, for example, in ISO 26623.

The adapter 2 comprises a profiled hollow shaft 102 which interacts with a clamping system 4 in the spindle 1. These hollow shaft clamping systems have also been known to a person skilled in the art for many years, for example from the documents mentioned in the introduction to the description.

Therefore, the polygon connection of adapter 2 and centering receptacle 7, the clamping system 4 and the cylinder structure 6 are assumed to be known, and only the aspects relevant to the invention are explained.

The spindle 1 can, for example, be part of a driven tool holder. That is to say, the spindle 1 has to be designed relatively compact in order to fit into the limited installation space of the tool holder. Therefore, the potentially available installation space in the interior of the spindle 1 is limited in the radial direction by the outer diameter and the length of the spindle 1.

Nevertheless, the clamping system 4 arranged in the spindle 1 has to fix an adapter 2 with a hollow shaft in the centering receptacle 7 in such a way that very good concentricity and axial run-out of the adapter 2 or the tool attached thereto is ensured at all times. In addition, the torque required for machining and the arising radial and axial forces must be reliably transmitted from the adapter 2 to the spindle 1. High clamping forces are therefore required in the axial direction; the adapters 2 and spindle 1 are clamped relative to one another in order to transmit the resulting forces, torsion and bending moments.

The clamping system 4 is generally clamped and released by a cylinder structure 6, which is actuated fluidically (e.g., pneumatically or hydraulically) and which is also integrated into the spindle 1. It is arranged behind the clamping system 4 in a stepped receiving bore 9 of the spindle 1. Any other systems for applying high axial forces can alternatively be used.

The cylinder structure 6 and the clamping system 4 are mounted from the front, i.e. by a centering receptacle 7 (inner polygon) of the spindle 1. As a result, the maximum diameter of the clamping system 4 and the cylinder structure 6 and the maximum diameter of the receiving bore 9 cannot be greater than the smallest inscribed circle of the centering receptacle 7.

The cylinder structure 6 comprises a piston rod 3 which transitions into a tension bolt 5 of the clamping system 4 or is connected thereto. The cylinder structure 6 must provide comparatively large actuating forces on the piston rod 3. An effective means for increasing the actuating forces is to increase the diameter of the pistons of the cylinder structure 6. However, the maximum diameter is predetermined by the diameter of the receiving bore 9. The diameter of the receiving bore 9 should therefore be as large as possible.

FIG. 1 shows the clamping system 4 and the cylinder structure 6 in two positions. Below the central line, the clamping system 4 is shown in the released position (loose position). Above the central line, the clamping system 4 is shown in the clamped position (clamping position).

From the comparison of the two positions of the tension bolt 5 in FIG. 1, it is clear that the tension bolt 5 pivots at least one clamping segment 33. When clamping the clamping system 4, the front end of the clamping segment 33 is pivoted radially outwards so that it dips into a groove of the hollow shaft 102.

In order for the clamping process to be carried out reliably both manually and automatically, the front end of the tension bolt 5 serves as a stop for the adapter 2.

The centering receptacle 7 is designed as an inner polygon. It can be an integral part of the spindle 1. However, it can also be a separate component which is inserted into the spindle 1.

A section of the receiving bore 9 adjoining the centering receptacle 7 receives the clamping system 4. A further adjoining section of the receiving bore 9 receives the cylinder structure 6.

Where the receiving bore 9 receives the clamping system 4 and the cylinder structure 6, it is designed as a cylindrical bore with a shoulder 13. In the shown exemplary embodiment, the receiving bore 9 is designed as a blind hole on the right-hand side in FIG. 1. However, this does not have to be the case.

In FIG. 1, it can also be seen that the clamping forces acting on the adapter 2 are transmitted via a conical contact surface 34 from the segments 33 to the spring housing 19 and from there to the collar 67.

The exemplary embodiments of spindles 1 according to the invention shown in FIG. 1 et seq. enable the mounting of clamping systems 4 and cylinder structures 6 by the polygonal centering receptacle 7, wherein the outer diameter of the clamping system 4 and the cylinder structure 6 is approximately the same size as the smallest inscribed circle of the centering receptacle 7. As a result, the external diameters of the clamping system 4 and the cylinder structure 6 can be maximized.

As already mentioned, the centering receptacle 7 is designed as a polygon (e.g. according to ISO 26623). This can be seen, for example, upon more precise examination of FIG. 1, for example in that the distances of the lines 7.1 and 7.2 of the centering receptacle 7 are different in size from the central line shown as a dash-dotted line.

A shoulder 60 arranged concentrically to the central line is denoted by 60 on the end face of the spindle 1. The line 7.1 marked a high point of the inner polygon of the centering receptacle 7. Therefore, the distance in the radial direction between the shoulder 60 and the line 7.1 is small compared to the distance in the radial direction between the shoulder 60 and the line 7.2, which marks a low point of the polygon. The points belonging to the lines 7.1 and 7.2 are marked in FIG. 2*b*.

An annular groove 65 is formed in the spindle 1 following the polygonal centering receptacle 7. This circular annular groove 65 is arranged concentrically with respect to the central line. It has a diameter which is equal to or greater than the circumference of the smallest inner polygon of the centering receptacle 7.

In the shown exemplary embodiment, the diameter of the annular groove 65 is approximately as large as the diameter of the "high point" of the inner polygon designated 7.1 in FIG. 2*b* at the transition between the centering receptacle 7 and the annular groove 65.

If the polygonal shape of the collar 67 is "cut" at the outer diameter (for example by twisting off the high points), then the diameter of the annular groove 65 can be smaller than the circumference of the high point 7.1 of the polygon at the transition between the centering receptacle 7 and the annular groove 65. In any case, the diameter of the annular groove 65 has to be somewhat larger than the inner diameter of the smallest polygon, but the axial forces that can be transmitted in the axial direction between the collar 67 and the annular groove 65 are then smaller. It is therefore desirable to use the whole polygonal shape and to select the diameter of the annular groove 65 to be as large as shown in FIG. 1.

Due to the polygonal cross section of the centering receptacle 7, a shoulder at the transition between the centering receptacle 7 and the annular groove 65 in the region of the lowest point 7.2 is significantly greater than at the high point 7.1. It can also be seen from the comparison of the distances between the lines 7.1 and 7.2 in the radial direction to the annular groove 65 that the centering receptacle 7 is an inner polygon.

In this exemplary embodiment, the clamping system 4 comprises a spring housing 19. A collar 67 is formed at the front end (left in FIG. 1) of the spring housing 19 and also has a polygonal outer contour in this exemplary embodiment (see FIG. 2*a* to *c*). The outer contour of the collar 67 is dimensioned such that it is minimally smaller than the smallest inner polygon of the centering receptacle 7. The outer contour of the collar 67 can, for example, be 0.1 mm smaller than the smallest inner polygon of the centering receptacle 7.

Because the outer contour of the collar 67 is somewhat smaller than the smallest inner polygon of the centering receptacle 7, the spring housing 19 can be inserted with its cylindrical part in a certain rotational position through the centering receptacle 7 into the part of the receiving bore 9 located behind the annular groove 65. In this rotational position, the collar 67 fits through the polygonal centering receptacle 7. This situation is shown in FIG. 2*a*.

By subsequently rotating the collar 67 relative to the spindle 1, the high points of the collar 67 move into the annular groove 65. A positive-locking fit acting in at least one axial direction is thereby created by the collar 67 between the spring housing 19 and the spindle 1. As a result, the clamping system 4 and the cylinder structure 6 arranged behind the clamping system 4 are axially fixed in the receiving bore 9 in the direction of the centering receptacle 7. In the exemplary embodiment shown in FIG. 1, the clamping system 4 is supported in the other direction by the cylinder structure 6 against the shoulder 13 of the receiving bore 9.

The insertion of the clamping system 4 and cylinder structure 6 into the spindle 1 and the subsequent production of a positive-locking fit is illustrated in three steps in FIGS. 2*a* to 2*c:*

These figures represent a plan view of the polygonal centering receptacle 7. The lines belonging to the centering receptacle 7 are designed as dash-dot-dot lines. The lines belonging to the collar 67 are solid.

In FIG. 2*a*, the collar 67 is positioned such that its outer contour has a smaller radius at each point than the smallest inner polygon of the centering receptacle 7 at this point. In the position of the collar 67 shown in FIG. 2*a*, it is therefore possible to displace the collar 67 axially in the direction of the receiving bore 9 by the smallest inner polygon of the centering receptacle 7 until the collar 67 is located in the annular groove 65.

When the collar 67 is rotated relative to the spindle 1 in this axial position, then the high points of the collar 67 dip into the annular groove 65. This results in a positive-locking fit acting in at least an axial direction between the collar 67 and the spindle 1. This situation is shown in FIG. 2*b*.

In the shown example, the angle of rotation is 60° between the rotational positions shown in FIGS. 2*a* and 2*b*. However, this can vary depending on the polygonal shape.

Figure 3:
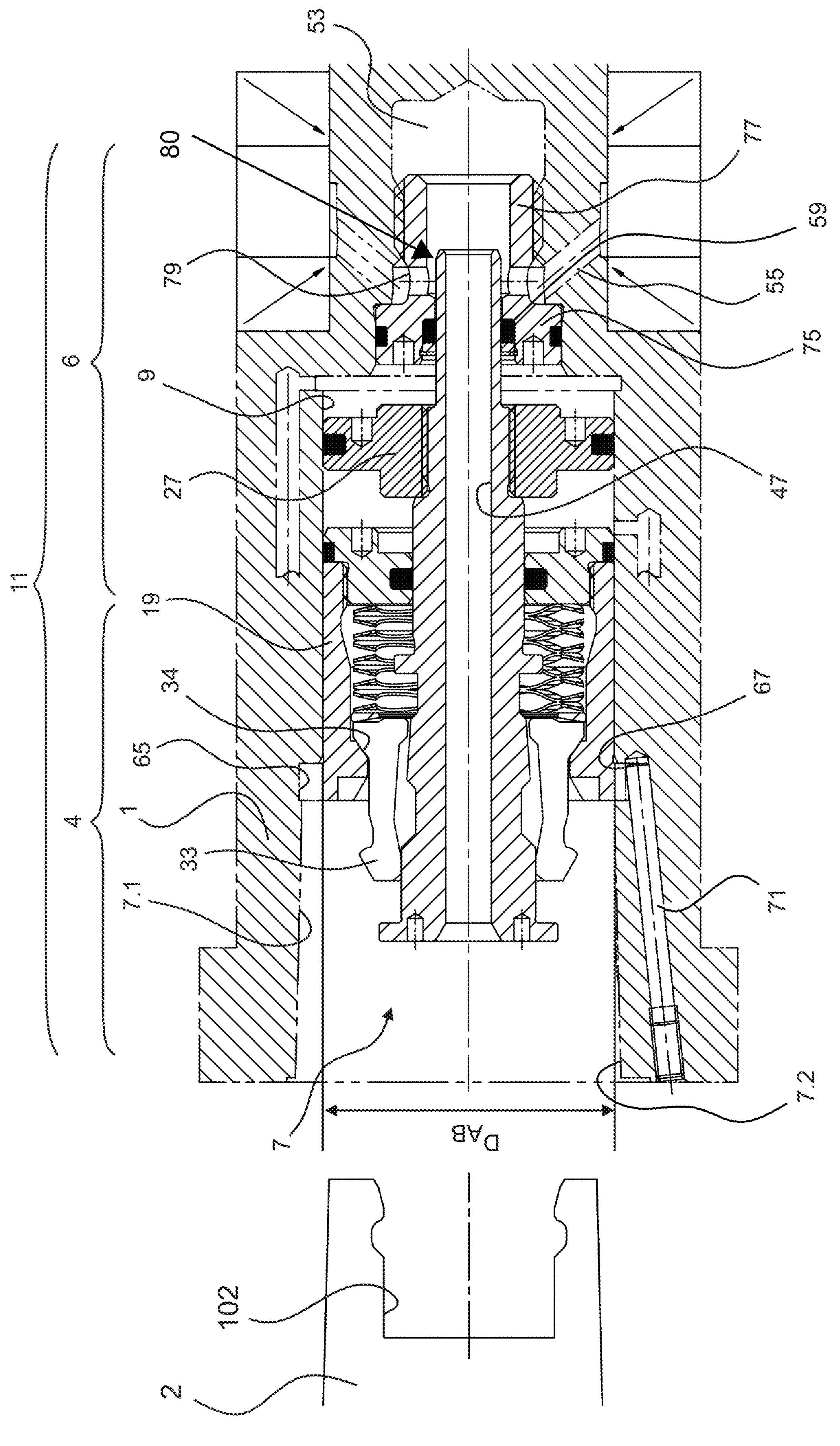
FIG. 3 shows another exemplary embodiment of the invention.

In the shown exemplary embodiment in FIG. 3, the width of the annular groove 65 is slightly larger than the width of the collar 67 so that the collar 67 can be rotated in the annular groove 65. A slight play (e.g., less than 0.1 mm) has no negative effects on the function and is therefore permissible. Since, in the exemplary embodiment shown in FIG. 3, the axial fixing of the clamping system 4 and the cylinder structure 6 takes place in both directions via the collar 67 and the annular groove 65, very small axial tolerances can easily be realized.

In the embodiment according to FIG. 1, the width of the annular groove 65 can be designed to be significantly wider than the width of the collar 67. Then only the left shoulder of the annular groove 65 (in the direction of the centering receptacle 7) takes over an axially position-determining and force-absorbing function. In the opposite direction, the support between the cylinder structure 6 and the spindle 1 can be at another point, for example, by the intermediate floor 15 and the shoulder 13 of the receiving bore 9. Here, the axial play depends on the sum of the component tolerances and is somewhat larger than in the exemplary embodiment shown in FIG. 3. Alternatively, for example by means of shims or grinding of a component, the existing play can also be adjusted or minimized as desired in FIG. 1.

In the exemplary embodiments shown in FIGS. 1 and 3, the outer contour of the collar 67 and the inner polygon of the centering receptacle 7 are geometrically similar. However, this does not have to be the case. The collar 67 could, for example, also consist of three lugs 68 offset by 120°. It is important for the collar 67 to fit through the smallest inner polygon of the centering receptacle 7 in a rotational position and to then establish a positive-locking fit in the axial direction between the collar 67 and the spindle 1 by rotating.

For dismantling the clamping system 4 and the cylinder structure 6, the collar 67 is simply rotated counterclockwise by 60° from the rotational position shown in FIG. 2*b* (as shown in FIG. 2*a*). The positive-locking fit is then released, and the collar 67 can be removed forwards through the centering receptacle 7. The clamping system 4 and the cylinder structure 6 can then be removed through the centering receptacle 7.

In order to secure this positive-locking fit generated by rotation and formed in at least one axial direction, a recess 69 is provided at a high point of the collar 67. The recess 69 is located in FIG. 2*a* at 16:00 o'clock. In FIG. 2*b*, it is at 18:00 o'clock. This corresponds to the mentioned angle of rotation of 60°.

In the position of the collar 67 shown in FIGS. 2*b* and 2*c*, a securing pin 71 is rotated through the spindle 1 into the recess 69 of the collar 67. This securing pin 71 is shown in FIGS. 1 and 2*c*. An unintentional rotation of the collar 67 relative to the spindle 1 is thereby prevented.

The securing pin 71 is accessible from the end face of the spindle 1. The threaded bore (without reference sign) in the spindle 1 runs approximately parallel to the centering receptacle 7 and ends in the annular groove 65 (see FIG. 1). When the securing pin 71 is inserted far enough into the (threaded) bore, its front end protrudes into the annular groove 65 and dips into the recess 69 of the collar 67. As long as the securing pin 71 dips into the recess, the spring housing 19 is secured against rotation.

The screwing-in or insertion of the securing pin 71 from the end or front side of the spindle 1 has several advantages:

With driven tool holders, no cooling lubricant from the centering receptacle 7 can pass through the threaded bore to the rolling bearings (not shown) with which the spindle 1 is held. If this case should occur, the rolling bearings are damaged.

In addition, the securing pin 71 is easily accessible and can be reached without removing the tool holder, which simplifies maintenance or repair of the clamping system.

Figure 2:
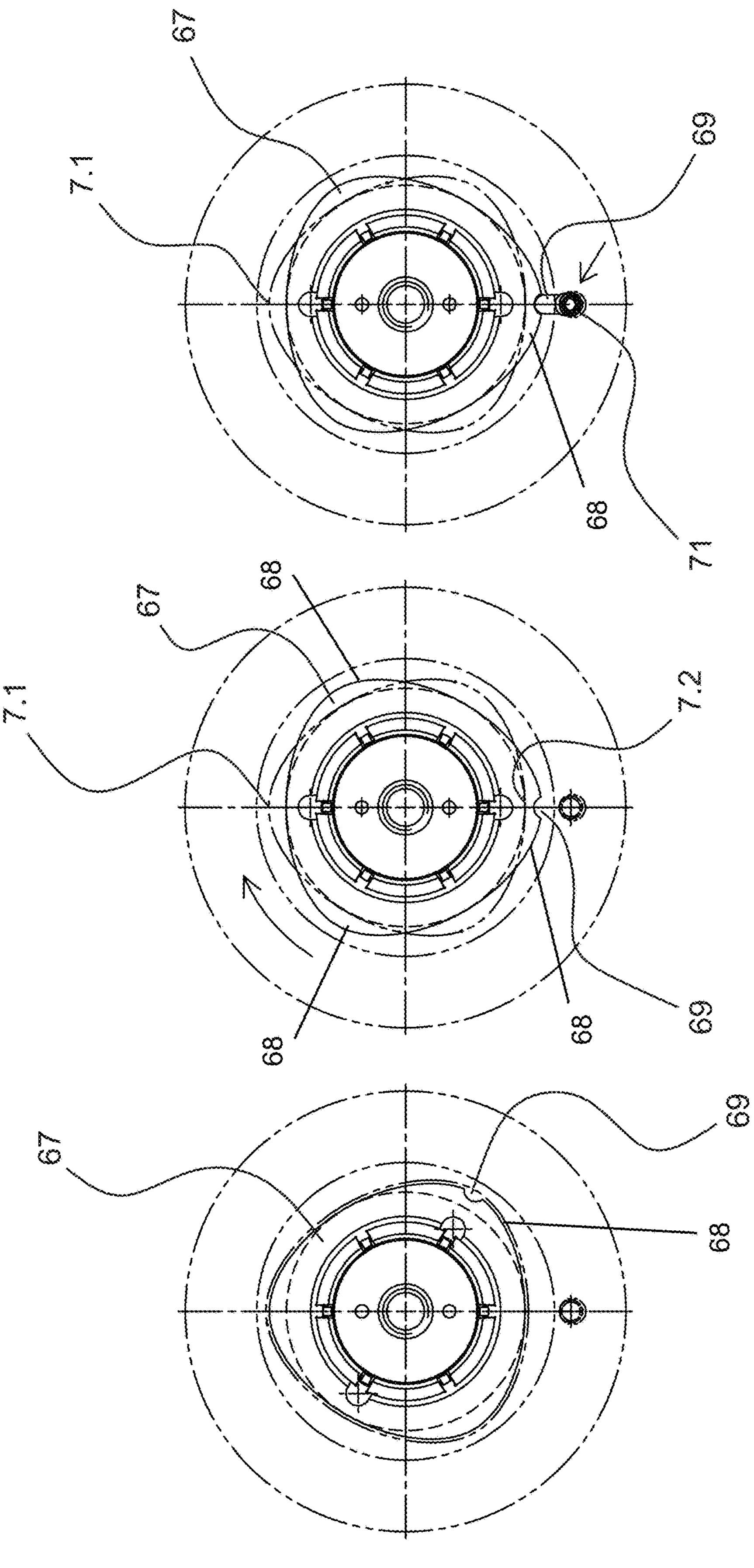
FIG. 2 shows the first exemplary embodiment of a view from the front in different (assembly) positions.

A special weight advantage of the type of axial locking mechanism according to the invention and explained with reference to FIGS. 1 and 2 is that the diameter of the cylindrical part of the receiving bore 9 is maximized. This can be explained very well with reference to FIG. 1.

If the line 7.2 (left of the annular groove 65) in the lower part of FIG. 1 and the adjacent cylindrical section of the receiving bore 9 are compared, it can then be seen that the diameter of the cylindrical part of the receiving bore 9 is almost as large as the inscribed circle diameter of the smallest inner polygon of the centering receptacle 7.

In other words: the locking mechanism according to the invention in the axial direction of the collar 67, here connected to the spring housing 19, does not require any additional space in the radial direction in the spindle 1. It also requires only very little installation space in the axial direction. The required installation space corresponds approximately to the width of the annular groove 65.

A direct positive consequence of maximizing the diameter of the cylindrical part of the receiving bore 9 is that the installation space available for the cylinder structure 6 becomes greater. That is to say that the diameter of the pistons 27 and 31 can be increased and, as a result, greater actuating forces can be provided by the cylinder structure 6 under otherwise identical boundary conditions. In addition, the radial installation space for the clamping system is also maximized, which allows it to be built more "robustly".

A further advantage of the locking mechanism according to the invention via the collar 67 on the spring housing 19 in the spindle 1 is that the number of components is reduced.

The cylinder structure 6 is described briefly below in FIG. 1. Starting from the shoulder 13, an intermediate floor 15 and a cylinder sleeve 17 are arranged in the receiving bore 9.

In addition to the cylinder sleeve 17, a spring housing 19 is provided in the receiving bore 9. The spring housing 19 belongs to the clamping system 4. The intermediate floor 15 and the cylinder sleeve 17 of the cylinder structure 6 are accordingly axially fixed in the axial direction by the shoulder 13 and the spring housing 19 in the receiving bore 9. The cylinder sleeve 17 also delimits a pressure chamber 37 of the cylinder structure 6.

There is an opening 21 in the inner diameter of the intermediate floor 15. The piston rod 3 projects through the opening 21. A seal 23, which surrounds the piston rod 3, is formed on the opening 21.

In this exemplary embodiment, the piston rod 3 has a shoulder 25. Starting at the shoulder 25, a piston 27, a piston rod sleeve 29, and a piston 31 are lined up on the piston rod 3.

The piston 31 is screwed onto the piston rod 3 at the right end of the piston rod 3 in FIG. 1. The piston 31 differs from the piston 27 primarily in two points: It fixes itself in the axial direction on the piston rod 3 and constitutes an axial lock for the piston 27 and the piston rod sleeves 29. In addition, the outer diameter of the piston 31 runs directly in a part of the receiving bore 9; there is no cylinder sleeve there.

The intermediate floor 15 divides the space delimited by the cylinder sleeve 17 and the receiving bore 9 into two partial chambers. A piston 27, 31 is located in both partial chambers. The pistons 27 or 31 in turn divide a partial chamber into a first pressure chamber 35 and a second pressure chamber 37. Because FIG. 1 shows the cylinder structure 6 and the clamping system 4 in two different positions, the pressure chambers 35 and 37 are different in size above and below the central line.

In the position of the piston rod 3 shown above the central line in FIG. 1, it is located at its right end stop. This right end stop is reached when the piston 31 rests with its end face against a seal support 59. If the first pressure chambers 35 are now filled with pressurized fluid, then the volume of the first pressure chambers 35 increases, and the pistons 31 or 27, and with it the piston rod 3, move to the left in FIG. 1 until they have reached the position shown below the central lines in FIG. 1. In this position, the clamping system 4 is released.

Due to the movement of the piston rod 3 and the pistons 27, 31, the volumes of the second pressure chambers 37 decrease. The intermediate floor 15 limits the path of the piston 31 to the left in FIG. 1. In this end position, the clamping system is open.

In both end positions (above or below the central line of FIG. 1), the piston 27 has a minimum distance from the flat surfaces of the intermediate floor 15 or of the cylinder sleeve 17. This has two effects. On the one hand, a defined piston surface is also available in the end positions; the so-called "hydraulic bonding" is avoided. On the other hand, overdeterminations of the end positions are avoided.

Because two pistons 27 and 31 are attached to the piston rod 3, and these pistons are supplied with a hydraulic or pneumatic force $F_{Hydr}$ by the pressurized fluid located in two first pressure chambers 35, the forces of the pistons 27 and 31 add up. The two pistons are connected in parallel. As a result, the cylinder structure 6 can provide relatively large actuating forces relative to the diameter of the piston 27 that is possible in terms of installation space.

If more installation space is present in the axial direction, three or more pistons can of course also be arranged one behind the other on the piston rod 3 and, as a result, the actuating force available on the tension bolt 5 can be further increased, or the fluid pressure required to generate the required clamping force can be reduced.

If the second pressure chambers 37 are now pressurized with pressurized fluid, the piston rod 3 and with it the tension bolt 5 move from the left end position (below the central line) to the right. Here too, an addition of the forces exerted by the pistons 27 or 31 onto the piston rod 3 takes place again. Due to the movement of the tension bolt 5 from the released position into the clamped position, the adapter 2 is pulled into the centering receptacle 7. For reasons of clarity, the adapter 2 is shown in FIG. 1 outside the centering receptacle 7.

The pressure chambers 35 and 37 are supplied via control lines 39, 41. In FIG. 1, a first control line 39 is formed in the lower part of the spindle 1, which supplies the first pressure chamber 35 of the piston 27 with pressurized fluid as needed via a radially extending bore or recess (without reference signs) in the spindle 1 and at least one subsequent radial bore (without a reference sign) in the cylinder sleeve 17.

via this first pressure chamber 35 of the piston 27, the fluid is guided into the first pressure chamber 35 of the piston 31 via a channel between the piston rod 3 and the piston rod sleeve 29 or piston 31. As a result, the radial installation space of the spindle 1 on the right-hand side can be reduced, and space is provided for the seal support 59 which, if coolant is required within the spindle 1, can transfer the coolant into the spindle 1.

The second pressure chambers 37 are supplied with pressurized fluid as required via a second control line 41 (above in FIG. 1) and radially extending bores or recesses in the spindle 1 (without reference signs). For the piston 27, the supply line is then guided into the pressure chamber 37 via at least one radial bore (without reference sign) in the cylinder sleeve 17. For the piston 31, the fluid is guided into the fluid space 37 via grooves in the intermediate floor 15.

Depending on which of the two control lines 39, 41 is supplied with pressurized fluid, the first pressure chambers 35 or the second pressure chambers 37 are pressurized and accordingly a force directed to the left or right in FIG. 1 acts on the pistons 27 and 31, which force is transmitted to the tension bolt 5 via the piston rod 3.

Releasable check valves (not shown) can be present in the control lines 39, 41. Like the control lines 39 and 41, the check valves are preferably arranged opposite one another, i.e. offset by 180° in the circumferential direction. In this way, the spindle 1, despite the control lines 39 and 41 and the check valves, is balanced very well. Only a relatively small dynamic imbalance arises even at high rotational speeds. This can also be compensated relatively easily by bores in the circumference of the spindle 1.

The optionally present releasable check valves ensure that the fluid located in the first pressure chambers 35 and the second pressure chambers 37 is held there, also against centrifugal forces which arise when the spindle 1 rotates, and with it the cylinder structure 6. In addition, the piston rod 3 and the tension bolt 5 coupled thereto are thereby held in their positions. This means an additional securing for the clamping system 4 against unintentional release.

In the shown exemplary embodiment in FIG. 1, the piston rod 3 and the tension bolt 5 are hollow-drilled; see the through-bore or central bore 47.

At the right end of the piston rod 3 in FIG. 1, the piston rod 3 penetrates a seal support 59 and ends in a supply space 53.

In this exemplary embodiment, the seal support 59 is screwed into the spindle 1. The seal support 59 comprises a flange 75 and a threaded section 77 with an external thread.

An annular groove 79 is formed between the seal support flange 75 and the threaded section 77. In the region of the threaded section 77, a gap 80 is formed between the piston rod 3 and the seal support 59 so that cooling lubricant can flow through one or more bores 81 from the annular groove 79 through the gap 80 into the supply space 53. From there, the cooling lubricant passes through the through-bore or central bore 47 into the region of the centering receptacle 7 or into the hollow shaft of the adapter 2.

A movement seal 51 is provided in the seal support 75 and interacts with a sealing section of the piston rod 3 and prevents the undesired escape of cooling lubricant from the supply space 53 in the direction of the cylinder structure 6 and of the clamping system 4, and at the same time also prevents fluid from escaping from the first pressure chamber 35 into the supply space 53.

Furthermore, a stationary seal between the seal support 75 and the spindle 1 is also provided. Both seals seal the first pressure chamber 35 against the supply space 53. They separate the fluid of the cylinder structure 6 from the cooling lubricant.

This design of the seal support 59 has several advantages:

It is built very compactly (especially in the axial direction) because a movement seal and a stationary seal are required only in the seal support 75, and because the gap present in the threaded section 77 between the seal support 59 and the piston rod 3 is used for transporting the cooling lubricant into the supply space 53.

The seal support 59 is also very advantageous from a manufacturing point of view; it can be mounted and removed very easily. The sealing support 59 is screwed in via a pin wrench whose pins enter into complementary bores in the end face of the seal support 59.

FIG. 3 shows another exemplary embodiment of the invention in a central position between an open and tensioned state. The cylinder structure 6 comprises only one piston 27 which is guided directly in a cylindrical section of the receiving bore 9 and not in a cylinder sleeve 17. With reference to this figure, it can be seen particularly well that the diameter of the piston 27 is almost as large as the inscribed circle of the centering receptacle 7.

Because the exemplary embodiment shown in FIG. 3 has fewer components, some details according to the invention can be seen better.

Two advantages essential to the invention can be explained well with reference to FIG. 3.

The diameter $D_{AB}$ of the receiving bore 9 is marked in FIG. 3. It can be clearly seen that the diameter $D_{AB}$ is just as large as the smallest inscribed circle of the centering receptacle. In other words: Based on the inscribed circle diameter of the centering receptacle 7 specified by standards, the locking mechanism of the clamping system 4 according to the invention does not require any installation space in the radial direction.

In the solutions known from the prior art, the diameter of the receiving bore is significantly smaller than the smallest inscribed circle of the centering receptacle, for example, because there are shoulders due to threads or stop edges.

Furthermore, in this exemplary embodiment, the collar 67 absorbs axial forces in both directions. The annular groove 65 is only wider than the collar 67 by a minimum necessary for production. The axial position of the spring housing 19 and therefore the clamping set 4 can therefore be adjusted very precisely.

Because the clamping system 4 is axially fixed by the collar 67 in both directions in the annular groove 65, the tolerance chain is very short and, as a result, the range of different types of mass-produced spindles 1 is very low.

In this exemplary embodiment, the piston 27 runs directly in a section of the stepped receiving bore 9. It is possible for the piston 27 to not be circular, but to have a polygonal outer contour. Accordingly, the associated section of the stepped receiving bore 9 is also designed as a polygon. As a result, the surface of the piston 27 can be increased, so that-assuming the same fluid pressure and the same external dimensions of the spindle 1—the actuating forces of the piston 27 are greater.

Figure 4:
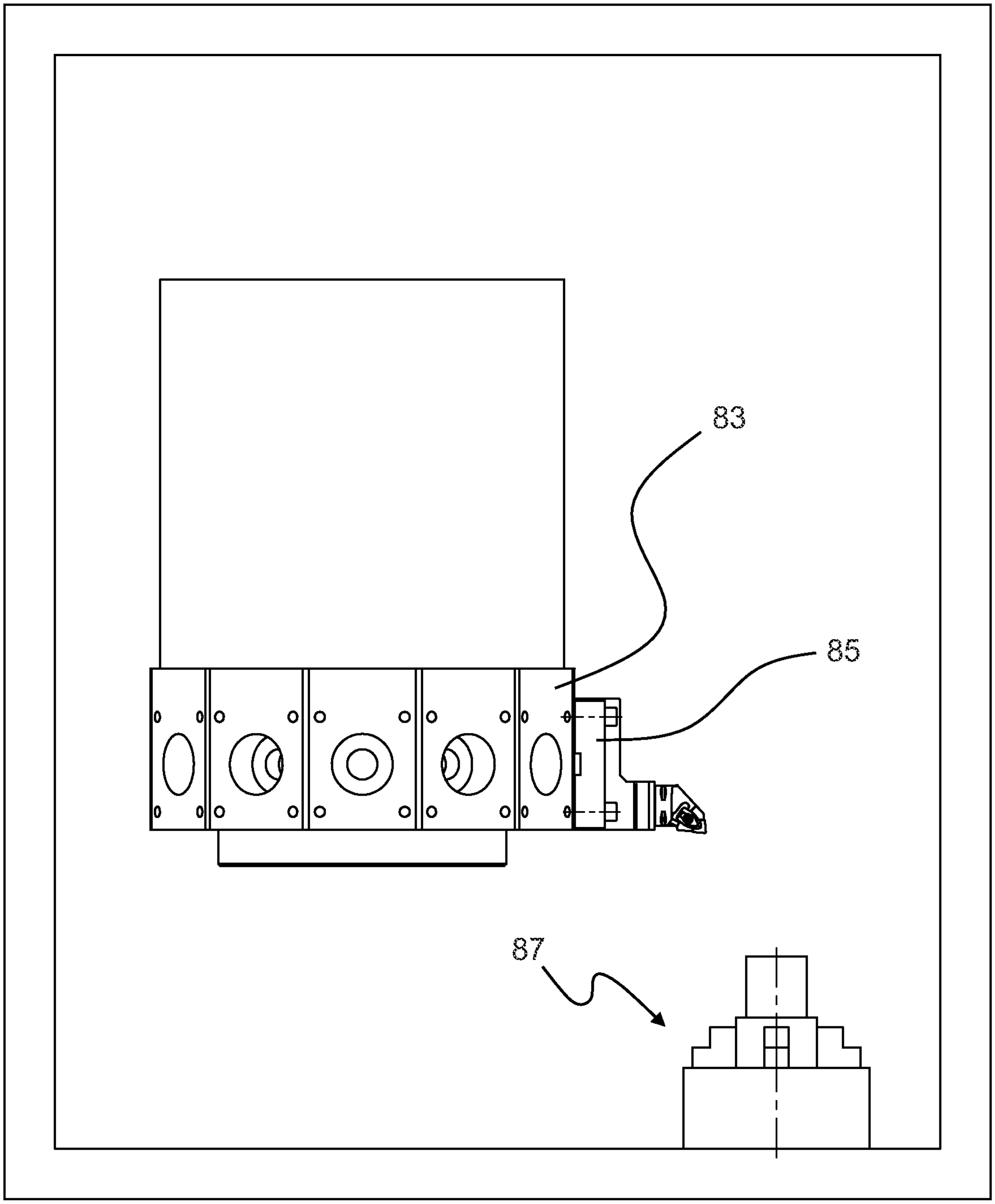
FIG. 4 shows a highly simplified representation of a tool holder in a machining center.

The arrangement of a tool holder 85, which is fastened to a turret 83 of a machining center, is illustrated with reference to FIG. 4. In FIG. 4, only one position of the turret 83 is occupied by a tool holder 85. The tool holder 85 carries a turning tool.

The spindle 87 with an indicated jaw chuck carries the workpiece so that the workpiece can be turned in the shown configuration.

LIST OF REFERENCE SIGNS 47750013DE

1 Spindle
2 Adapter
3 Piston rod
4 Clamping system
5 Tension bolt
6 Cylinder structure
7 Centering receptacle
7.1 Line
7.2 Line
9 Receiving bore
11 Recess
13 Shoulder in the receiving bore
15 Intermediate floor
17 Cylinder sleeve
19 Spring housing
21 Opening
23 Seal
25 Shoulder of the piston rod 3
27 Piston
29 Piston rod sleeve
31 Piston
33 Clamping segment
34 Conical contact surface
35 First pressure chamber
37 Second pressure chamber
39 First control line
41 Second control line
47 Through-bore or central bore
51 Seal
53 Supply space
55 Bore
59 Seal support
60 Shoulder
65 Annular groove
67 Collar
68 Lug
69 Recess
71 Securing pin
75 Seal support
77 Threaded section
79 Annular groove
80 Gap
81 Bore
83 Turret
85 Tool holder

87 Spindle of the machining center

102 Hollow shaft $D_{AB}$ Diameter of the receiving bore 9

The invention claimed is:

1. A spindle having a recess (11) which comprises a centering receptacle (7) for an adapter (2) having a polygonal outer contour and a hollow shaft, the recess (11) further comprising an annular groove (65) and a receiving bore (9), wherein a clamping system (4) is arranged in the receiving bore (9), wherein the clamping system (4) has a collar (67), wherein the collar (67) has a polygonal outer contour, or the outer contour is formed by a plurality of lugs (68), wherein the collar (67) fits through the centering receptacle (7) in at least one position, and wherein an at least one-sided positive-locking fit is established between the collar (67) and the annular groove (65) by rotating the collar (67) relative to the spindle (1), such that the collar (67) engages into the annular groove (65) and is thereby axially fixed relative to the spindle (1).

2. The spindle according to claim 1, characterized in that a diameter of the annular groove (65) is as large as or greater than a circumference of the collar (67).

3. The spindle according to claim 1, characterized in that a width, measured in an axial direction, of the annular groove (65) is as large as or greater than a width, measured in the axial direction, of the collar (67).

4. The spindle according to claim 1, characterized in that an inscribed circle of a smallest inner polygon of the centering receptacle (7) at a transition between the centering receptacle (7) and the annular groove (65) is smaller than a circumference of the collar (67).

5. The spindle according to claim 1, characterized in that the annular groove (65) is arranged at a transition between the centering receptacle (7) and the receiving bore (9).

6. The spindle according to claim 1, characterized in that the collar (67) is formed at a front end of a housing (19), and in that the collar (67) or the housing (19) is secured in a positive-locking fit against rotation in the spindle (1).

7. The spindle according to claim 6, characterized in that a securing pin (71) is inserted into the spindle (1), and the securing pin (71) dips into a recess of the collar (67).

8. The spindle according to claim 7, characterized in that the collar (67) has a polygonal outer contour, and in that the recess (69) is arranged at a vertex of the polygonal outer contour of the collar (67).

9. The spindle according to claim 7, characterized in that the recess (69) is arranged in a lug (68) of the collar (67).

10. The spindle according to claim 6, characterized in that a securing pin (71) is inserted into the spindle (1), and in that the securing pin (71) dips into the annular groove (65) at a location next to a vertex of the polygonal outer contour of the collar (67) or a lug (68) of the collar (67).

11. The spindle according to claim 1, characterized in that the receiving bore (9) is designed as a polygon in a section thereof.

12. The spindle according to claim 11, characterized in that a cylinder structure (6) comprising one or more pistons (27) is arranged in the receiving bore (9), and in that the one or more pistons (27) are also designed as a polygon.

13. The spindle according to claim 1, characterized in that the clamping system (4) comprises a housing (19), and in that the collar (67), or the collar (67) and the housing (19), are rotatable relative to a remainder of the clamping system (4) or a cylinder structure (6) arranged in the receiving bore (9).

14. The spindle according to claim 1, characterized in that a cylinder structure (6) for actuating the clamping system (4) is arranged in the receiving bore (9), in that the cylinder structure (6) comprises a piston rod (3), in that the piston rod (3) has a central bore (47) for supplying a tool clamped in the clamping system with a medium, the medium being a cooling lubricant, and in that the piston rod (3) penetrates a seal support (59) and ends in a supply space (53) of the spindle (1).

15. The spindle according to claim 14, characterized in that the seal support (59) comprises a flange (75) and a threaded section (77) having an external thread, in that an annular groove (79) is formed between the flange (75) and the threaded section (77), in that a gap (80) is formed in a region of the threaded section (77) between the piston rod (3) and the seal support (59), and in that at least one bore (81) connects the annular groove (79) and the gap (80) to one another.

16. The spindle according to claim 15, characterized in that at least one bore (55) is provided in the spindle (1), and in that the at least one bore (55) opens into a space delimited by the annular groove (79) and the spindle (1).

17. The spindle according to claim 14, characterized in that at least one seal (51) is arranged in the seal support (59).

18. The spindle according to claim 1, characterized in that the spindle (1) is part of a driven or stationary tool holder (85).

19. A tool holder comprising a spindle (1) and a mechanical interface for fastening to a turret of a lathe or a machining center, characterized in that the spindle (1) is a spindle according to claim 1.

20. The tool holder according to claim 19, characterized in that the spindle (1) is rotatably mounted or fixed in the tool holder (85).

* * * * *